US006998102B2

(12) United States Patent
Coronado

(10) Patent No.: US 6,998,102 B2
(45) Date of Patent: Feb. 14, 2006

(54) RAPID PROCESS FOR PRODUCING TRANSPARENT, MONOLITHIC POROUS GLASS

(75) Inventor: Paul R. Coronado, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 472 days.

(21) Appl. No.: 10/253,142

(22) Filed: Sep. 23, 2002

(65) Prior Publication Data

US 2004/0055334 A1   Mar. 25, 2004

(51) Int. Cl.
    *C03B 8/02*   (2006.01)
(52) U.S. Cl. ........................ 423/338; 65/17.2
(58) Field of Classification Search ................ 65/17.2, 65/395, 440; 423/338
    See application file for complete search history.

(56) References Cited

U.S. PATENT DOCUMENTS

| | | | | |
|---|---|---|---|---|
| 4,765,818 A | * | 8/1988 | Che et al. ...................... 65/395 |
| 4,937,017 A | * | 6/1990 | Gillberg-LaForce et al. ........................ 252/582 |
| 5,023,208 A | * | 6/1991 | Pope et al. .................... 501/12 |
| 5,558,849 A | * | 9/1996 | Sharp .......................... 423/338 |
| 5,565,014 A | * | 10/1996 | Fleming, Jr. .................. 65/384 |
| 5,958,577 A | * | 9/1999 | Sugimoto et al. ............ 428/333 |
| 6,824,866 B1 | * | 11/2004 | Glazer et al. ............. 428/317.9 |

* cited by examiner

*Primary Examiner*—Sean Vincent
(74) *Attorney, Agent, or Firm*—James S. Tak; Alan H. Thompson

(57) ABSTRACT

A process for making transparent porous glass monoliths from gels. The glass is produced much faster and in much larger sizes than present technology for making porous glass. The process reduces the cost of making large porous glass monoliths because: 1) the process does not require solvent exchange nor additives to the gel to increase the drying rates, 2) only moderate temperatures and pressures are used so relatively inexpensive equipment is needed, an 3) net-shape glass monoliths are possible using this process. The process depends on the use of temperature to control the partial pressure of the gel solvent in a closed vessel, resulting in controlled shrinking during drying.

14 Claims, No Drawings

US 6,998,102 B2

RAPID PROCESS FOR PRODUCING TRANSPARENT, MONOLITHIC POROUS GLASS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to transparent, monolithic porous glass, particularly a process for making large sizes of transparent porous glass monoliths from gel, and more particularly to such a process which depends on using temperature to control the partial pressure of the gel solvent in a closed vessel, resulting in controlled shrinking during drying.

Porous glass has been developed for applications ranging from lightweight optics to nuclear particle detectors and sorption media. Highly porous glass (i.e., porosity >85%) called aerogels, typically require special techniques to successfully dry large uncracked pieces. Intermediate porosities (i.e., porosity >40% but <85%) called xerogels, usually require long drying times (e.g., several weeks for pieces > a few square centimeters). Also, such xerogels are not very transparent in a particular range of porosities (40% to 85%) due to scattering from aggregates within the gel. Thus, new methods are needed to rapidly process porous glass and also to fabricate transparent porous glass having specific refractive indexes.

The present invention provides a method for rapidly making transparent porous glass monoliths from gels. The glass can be produced much faster and in much larger sizes than by present technology for making porous glass. The method of this invention depends on using temperature to control the partial pressure of the gel solvent in a closed vessel, resulting in controlled shrinkage during drying. The final density of the produced transparent porous glass monoliths is determined by the recipe for the gel and the time and temperature. The method of this invention involves preparing gels which shrink during drying due to strong capillary forces at the liquid-solid-vapor interface.

SUMMARY OF THE INVENTION

It is an object of the present invention to provide large sized transparent porous glass monoliths.

A further object of the invention is to provide a process for rapidly making large sized transparent porous glass monoliths from gels.

A further object of the invention is to provide a process for making such monoliths utilizing a recipe for the gel and the time and temperature for determining the final density of the porous glass monoliths.

Another object of the invention is to provide a low cost process for making large (6.6 to 52.5 $cm^2$) porous glass monoliths which dos not require additive or solvent exchange to increase drying rates, utilizes moderate temperatures and pressures, and can produce net-shape glass monoliths.

Another object of the invention is to provide a process or method for rapidly making large transparent porous glass monoliths from gels which depends on using temperature to control the partial pressure of the gel solvent in a closed vessel, resulting in controlled shrinking during drying.

Another object of the invention is to provide a method or process for producing large porous glass monoliths which involves preparing gels which shrink drying due to strong capillary forces at the liquid-solid-vapor interface.

Other objects and advantages of the present invention will become apparent from the following description. The present invention involves the production of large (6.6 to 52.5 $cm^2$) transparent, monolithic porous glass. The process of this invention produces the porous glass monoliths from gels which shrink during drying due to strong capillary forces at the liquid-solid-vapor interface. The process of this invention does not require solvent exchange nor additives to the gel to increase the drying rates, and uses only moderate temperatures and pressures, as well as being capable of producing net-shape glass monliths. The transparent porous glass monoliths produced by the present invention final application in nuclear particle detectors, as well as in strong, lightweight optics for eyeglasses, lenses, telescopes, etc., since the final density of the porous glass monoliths can be determined by a recipe for the gel and the time and temperature.

DETAILED DESCRIPTION OF THE INVENTION

The present invention involves the fabrication of transparent, monolithic porous glass, and involves a process for rapidly making such transparent porous glass monoliths from gels. By the process or method of this invention, the glass monoliths can be produced much faster and in much larger sizes than by the present technology. Thus process reduces the cost of making large porous glass monoliths because: 1) the process does not require solvent exchange nor additives to the gel to increase the drying rates, 2) only moderate temperatures and pressures are used so relatively inexpensive equipment is needed, and 3) net-shape glass monoliths can be produced. The process involves preparing gels which shrink during drying due to strong capillary forces at the liquid-solid-vapor interface. The process depends on using temperature to control the partial pressure of the gel solvent (including an alcohol such as methanol, (i.e., MeOH) or ethanol, EtOH) in a closed vessel, resulting in controlled shrinking during drying. The final density of the transparent porous glass monoliths (xerogels) is determined by the recipe for the gel and the time and temperature.

Following preparing gels which shrink during drying due to strong capillary forces at the liquid-solid-vapor interface, the pre-formed gels are contained within a mold which is placed within a vessel capable of pressure up to 50 psi at temperature up to 300° C. The mold containing the gels is loosely sealed (sealed sufficient to hold liquid but insufficient for >15 psi pressure). A small amount of the same solvent as contained in the gel, is placed within the vessel along with the mold. The amount of solvent placed within the vessel may be about 1.0% to 10.0% of the amount contained in the gel. The purpose of this amount of solvent (liquid) is to provide a vapor surrounding the gel containing mold, at a sufficient partial pressure to control the rate of solvent leaking from the gel contained in the mold. The temperature of the vessel is increased to 60° C. from room temperature, in 60 minutes. The pressure in the vessel rises to about 50 psi and any excess pressure is allowed to leak out for 10 hours. When the pressure in the vessel drops to approximately 15 psi (i.e., 1 atmosphere), the temperature of the vessel is increased to 300° C. in 1 hour while excess pressure is released. The heaters are interrupted after 1 hour and the vessel is evacuated while it cools. The mold is removed from the vessel after cooling and the porous glass monolith is removed from the mold. The density of the produced monolith is dependent on the composition of the gel and the time and temperature utilized. The density of the monolith produced from the same pre-formed gel may be changed by the time and temperatures utilized in the process. For example, increasing time and temperature will result in an increase of the density of the thus formed porous glass monolith.

The following example of the process of the present invention is set forth:

1. forming a gel containing TMOS and $H_2O$ with a solvent including MeOH, for example, 54.5% of TMOS, 32.4% of $H_2O$, and 13.1% of solvent (MeOH).

2. containing the thus formed gel in a mold defining an area of 6.6 to 52.5 square centimeters, for example.

3. placing the mold with a vessel capable of pressures up to 50 psi at temperature upon to 300° C.

4. placing a quantity (1.0% to 10.0%) of the MeOH (solvent) used in the gel within the vessel, which can be done using a small open container.

5. sealing the vessel loosely to hold the liquid gel up to a pressure not greater than 15 psi.

6. increasing the temperature of the vessel from room temperature to 60° C. in 60 minutes, which causes the pressure in the vessel to rise to about 50 psi.

7. allowing any excess pressure (above 50 psi) to leak out.

8. allowing the pressure in the vessel to leak out for 10 hours to a pressure of about 15 psi.

9. when the pressure in the vessel drops to about 15 psi, the temperature of the vessel is increased to 300° C. in 1 hour, while pressure above 15 psi is released.

10. interrupting the heaters after 1 hour, 11. allowing the vessel to cool, 12. evacuating the vessel while it cools, 13. removing the mold from the cooled vessel, 14. removing the thus formed porous glass monolith from the mold.

By way of example, the thus formed glass monolith using the gel composition and time and temperature of this example would have a density of 0.90 to 1.1 g/cc.

It has thus been shown that the present invention enables the production of large sized (6.6×52.5 cm$^2$) transparent, monolithic porous glass (an xerogel having an intermediate porosity of >40% but <80%), produced by a process which is rapid and inexpensive compared to current technology utilized for fabricating porous glass. The density of the produced monolith can be controlled by the composition of the gel and time and temperature. Transparent porous glass monoliths made by this invention will find use as strong, lightweight optics for eyeglasses, lenses, telescopes, etc., as well as intermediate density porous glass for nuclear particle detectors, for example.

While a specific sequence of operations, materials, pressures, times, etc. have been set forth to exemplify and teach the principles of the invention, such are not intended to be limiting. Modifications and changes may become apparent to those skilled in the art, and it is intended that the scope of the invention be limited only scope of the appended claims.

What is claimed is:

1. A process for producing transparent, monolithic porous glass, comprising:
providing a preformed gel containing a solvent and which shrinks during drying due to strong capillary forces at the liquid-solid-vapor interface,
placing the gel in a mold,
placing the mold in a vessel capable of containing pressures up to 50 psi at a temperature up to 300°,
positioning in the vessel a quantity of the same solvent as in the gel,
loosely sealing the mold in the vessel whereby there is leakage from the vessel above a selected pressure,
increasing the temperature of the vessel from room temperature to a first temperature in a first time period, to increase pressure in the vessel to about 50 psi,
allowing the pressure in the vessel to leak out over a second time period to a pressure of about 15 psi,
increasing the temperature in the vessel to a second temperature in a third time period, while releasing any pressure increase above 15 psi,
allowing the vessel to cool and evacuating the vessel while cooling,
removing the mold from the vessel, and removing a transparent porous glass monolith from the mold.

2. The process of claim 1, wherein the solvent is selected from the group consisting of MeOH, acetone, and EtOH.

3. The process of claim 1, wherein the preformed gel comprises about 50–60% of TMOS, about 30–35% of $H_2O$, and about 12–14% of MeOH.

4. The process of claim 1, wherein the selected pressure is about 15 psi.

5. The process of claim 1, wherein said first temperature is 60° and said first time period in 60 minutes.

6. The process of claim 1, wherein the second time period is about 10 hours.

7. The process of claim 1, wherein the second temperature is 300° C. and the third time period is 1 hours.

8. A porous glass monolith having a size of 6.6 to 52.5 cm$^2$×0.32 to 0.95 cm, produced by the method of claim 1.

9. The porous glass monolith of claim 8 being transparent at porosities in the range of about 40% to about 85%.

10. The porous glass monolith of claim 9 formed from a pre-formed gel composed of the materials of claim 3.

11. In a process for producing monolithic porous glass, the improvement comprising:
utilizing gels which shrink during drying due to strong capillary forces at the liquid-solid-vapor interface, said gels containing a gel solvent and
utilizing temperature to control the partial pressure of the gel solvent in a closed vessel, resulting in controlled shrinking during drying, wherein said closed vessel is a loosely sealed vessel whereby leakage occurs above a specified pressure.

12. The improvement of claim 11, wherein the specified pressure is about 15 psi.

13. The improvement of claim 11, additionally including preparing a recipe for the gel and the time and temperature for determining final density of the formed monolithic porous glass.

14. The improvement of claim 13, wherein the recipe utilized in the process results in the thus formed monolithic porous glass being transparent.

* * * * *